US006777841B2

(12) United States Patent
Steinmeyer

(10) Patent No.: US 6,777,841 B2
(45) Date of Patent: Aug. 17, 2004

(54) DEVICE COMPRISING A ROTOR AND A MAGNETIC SUSPENSION BEARING FOR THE CONTACTLESS BEARING OF THE ROTOR

(75) Inventor: Florian Steinmeyer, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/398,778

(22) PCT Filed: Sep. 21, 2001

(86) PCT No.: PCT/DE01/03655

§ 371 (c)(1),
(2), (4) Date: Apr. 9, 2003

(87) PCT Pub. No.: WO02/31371

PCT Pub. Date: Apr. 18, 2002

(65) Prior Publication Data

US 2003/0184176 A1 Oct. 2, 2003

(30) Foreign Application Priority Data

Oct. 9, 2000 (DE) ......................................... 100 49 821

(51) Int. Cl.⁷ ............................ F16C 32/04; F16C 39/06
(52) U.S. Cl. ........................ 310/90.5; 310/64; 505/166
(58) Field of Search ........................ 310/90.5, 55, 52, 310/64; 505/166

(56) References Cited

U.S. PATENT DOCUMENTS

| 5,214,981 | A |   | 6/1993 | Weinberger et al. | ........ 310/90.5 |
| 5,314,868 | A | * | 5/1994 | Takahata et al. | ............. 505/166 |
| 5,341,059 | A |   | 8/1994 | Fukuyama et al. | ........ 310/90.5 |
| 5,482,919 | A |   | 1/1996 | Joshi | ........................... 310/52 |
| 5,710,469 | A |   | 1/1998 | Ries | ........................... 310/90.5 |
| 5,760,506 | A |   | 6/1998 | Ahlstrom et al. | ............. 310/74 |
| 6,043,577 | A |   | 3/2000 | Bornemann et al. | .......... 310/74 |
| 6,376,943 | B1 | * | 4/2002 | Gamble et al. | ................ 310/52 |
| 6,489,701 | B1 | * | 12/2002 | Gamble et al. | ............. 310/179 |
| 6,597,082 | B1 | * | 7/2003 | Howard et al. | ............. 310/261 |

FOREIGN PATENT DOCUMENTS

| DE | 42 32 869 A1 |   | 4/1993 | ........... F16C/32/04 |
| DE | 42 34 524 A1 |   | 4/1993 | ........... F16C/32/04 |
| DE | 44 36 831 C2 |   | 9/1997 | ........... F16C/32/04 |
| DE | 196 36 548 A1 |   | 10/1997 | ........... F16C/32/04 |
| DE | 197 10 501 A1 |   | 1/1998 | ............. H02K/7/09 |
| DE | 0 797 725 B1 | * | 4/1998 | ........... F16D/25/16 |
| EP | 0797725 B1 | * | 4/1998 | ........... F16D/25/16 |
| JP | 04370417 A |   | 12/1992 | ........... F16C/32/04 |
| JP | 6-101715 | * | 4/1994 | ........... F16C/32/00 |
| JP | 6-165478 | * | 6/1994 | .......... H02K/55/04 |
| JP | 8-121480 | * | 5/1996 | ........... F16C/32/04 |
| JP | 9-205741 | * | 8/1997 | ........... F16C/32/04 |
| JP | 10-136609 | * | 5/1998 | ............. H02K/7/09 |
| JP | 10-318259 | * | 12/1998 | ........... F16C/32/04 |

OTHER PUBLICATIONS

Patent Abstract of Japan, Publication No. 06165478, Publication Date Jun. 10, 1994.
Patent Abstract of Japan, Publication No. 09205741, Publication Date Aug. 5, 1997.

* cited by examiner

Primary Examiner—Burton Mullins
(74) Attorney, Agent, or Firm—Staas & Halsey LLP

(57) ABSTRACT

The device comprises a) a rotor which can rotate or rotates about a rotational axis and b) at least one magnetic suspension bearing, in which the rotor can be or is mounted in a contactless manner and which comprises at least one superconductive structure in addition to several permanent magnets, and c) a cooling device comprising at least one refrigeration head for cooling the super-conductive structure of the or each magnetic suspension bearing, whereby d) the rotor and each magnetic suspension bearing are arranged in a common gas chamber, which is surrounded by a gas-proof wall. The advantage of the device is that ice is prevented from forming on the magnetic suspension bearing.

32 Claims, 5 Drawing Sheets

DEVICE COMPRISING A ROTOR AND A MAGNETIC SUSPENSION BEARING FOR THE CONTACTLESS BEARING OF THE ROTOR

CROSS REFERENCE TO RELATED APPLICATIONS

This application is based on and hereby claims priority to PCT Application No. PCT/DE01/03655 filed on 21 Sep. 2001 and German Application No. 100 49 821.3 filed on 9 Oct. 2000, the contents of which are hereby incorporated by reference.

BACKGROUND OF THE INVENTION

The invention relates to a device having at least one rotor which rotates or can rotate about a rotation axis, and having at least one magnetic bearing in which the rotor is borne or can be borne in a contactless manner.

U.S. Pat. No. 5,482,919 A discloses a device which has a rotor which can rotate about a rotation axis and has at least one superconducting winding (field coil) for an electric motor, and has a cryogenic cooler for cooling the superconducting winding. The superconducting winding may be formed from a known, metallic superconductor material (low-temperature superconductor) with a low critical temperature of $T_c$, below 35 K, such as a niobium-tin alloy or a ceramic metal-oxide superconductor material (high-temperature superconductor) with a high critical temperature $T_c$ above 35 K, such as bismuth strontium calcium copper oxide, an yttrium barium copper oxide or a mercury or thallium compound. The cryogenic cooler makes use of rapid expansion of a working fluid (which is compressed by a compressor) such as helium, neon, nitrogen, hydrogen or oxygen for cooling in thermodynamic cycles (processes) such as a Gifford-McMahon cycle, a Stirling cycle or a pulse tube cycle. The superconducting winding is thermally conductively connected to a cold head, which rotates with the rotor, of the cryogenic cooler via two or more annular supporting elements composed of a material with a high thermal conductivity coefficient, and which are connected via heat pipes or thermally conductive rods. In this way, heat is dissipated from the superconducting winding by thermal conduction through a solid body to the cold head. There is no need for a liquid coolant such as liquid helium or liquid nitrogen in this known cooling system, so that there is also no influence on the rotation of the rotor from a cold liquid. The compressor of the cryogenic cooler can rotate with the rotor or may be in a fixed position with respect to the rotor, and may be connected to the cold head via a rotating coupling. U.S. Pat. No. 5,482,919 A states nothing more with regard to the bearing of the rotor.

Magnetic bearings are generally known for bearings for rotors, and allow the rotors to be borne in a contactless bearing, which is thus free of wear. Both active magnetic bearings with electromagnets and position control as well as passive magnetic bearings with automatic position stabilization are known.

DE 44 36 831 C2 discloses a passive magnetic bearing for bearing a rotor shaft with respect to a stator, which has a first bearing part which is connected to the rotor shaft, and a second bearing part which is arranged on the stator and surrounds the first bearing part. One of the two bearing parts has a high-temperature superconductor. The other bearing part has an arrangement of permanent-magnet elements arranged alongside one another and composed of a neodymium (Nd), Iron (Fe) boron (B) alloy or of a samarium (Sm) cobalt (Co) alloy. Adjacent permanent-magnet elements are magnetized with opposite polarity to one another. When a position change occurs, the permanent-magnet elements induce shielding currents in the superconductor, as a result of field changes. The resultant forces may be repulsive or attractive, but are always directed such that they counteract the deflection from the nominal position. In contrast to known active magnetic bearings, an inherently stable bearing can be achieved in this case, and there is no need for a complex control system that is subject to defects. The intermediate spaces between in each case two permanent-magnet elements are filled with ferromagnetic material in order to concentrate the magnetic flux, which emerges from the permanent-magnet elements, on the side facing the other bearing part. This results in a high level of bearing stiffness (stability, robustness). The permanent-magnet elements together with the ferromagnetic intermediate elements may be arranged axially with respect to the rotor shaft axis one behind the other in the form of thin rings, or else may be axially elongated and arranged one behind the other in the circumferential direction.

In a refinement of this known magnetic bearing, the permanent magnets are provided in a hollow-cylindrical arrangement on the inner bearing part, and the superconductor is arranged as a hollow-cylindrical structure on the inside of a hollow-cylindrical supporting body for the outer bearing part. Cooling channels are formed in the supporting body for passing liquid nitrogen through in order to cool the superconductor.

In another refinement according to DE 44 36 831 C2, the high-temperature superconductor on the inner bearing part is arranged on the rotor shaft, with a coolant channel being provided for the liquid nitrogen in the rotor shaft, in order to cool the high-temperature superconductor. This embodiment with a cold rotor body is proposed as part of a generator or of a motor with a cryogenic normally conductive or superconducting winding.

The document U.S. Pat. No. 5,214,981 A discloses a device for storing energy. This device has a rotating flywheel which has permanent magnets (which interact with stationary electromagnets) on its circumference for power transmission. The flywheel is borne in each case one magnetic bearing on opposite sides via two rotor shafts. In one embodiment (FIG. 1), one or more permanent magnets are provided in a cylindrical arrangement at each of the ends of the two rotor shafts. These ends project as first bearing parts into in each case one superconductor, in the form of a pot, as the second bearing part for the respective magnetic bearing. For cooling, the superconductors are each arranged in a cold bath of liquid nitrogen. In another embodiment (FIG. 3), each rotor shaft has a recess as the first magnetic bearing part on its end face facing away from the flywheel, with this recess being clad with a superconductor. The superconductor is cooled exclusively by the thermal radiation from the superconductor to the vacuum vessel, which is kept in a liquid bath filled with liquid nitrogen. Furthermore, the magnetic bearings have cylindrical second bearing parts, whose ends project into the recesses in the rotor shafts and have one or more permanent magnets in a cylindrical arrangement. The flywheel is enclosed together with the two magnetic bearings in a vacuum vessel which is evacuated to a pressure of less than $10^{-4}$ Torr, in order to avoid friction of the rotating parts and the energy losses associated with such friction. The bearing gaps of the two magnetic bearings form continuous connections between the adjacent evacuated areas of the vacuum vessel.

JP 04370417 A and the associated abstract from Patent Abstracts of Japan disclose a further device for storing energy by a flywheel which is borne in two magnetic bearings and is arranged together with the magnetic bearings in a common evacuated vacuum chamber. Each magnetic bearing has a central permanent-magnet ring on the flywheel and two superconductor rings at an axial distance from it, which are arranged on stationary supporting disks, through which liquid coolant flows.

Finally, DE 197 10 501 A1 discloses an electrical machine having a stator with a polyphase winding for producing a rotating magnetic field, and with a rotor which rotates with the rotating field. The stator has a magnetic return path yoke, which forms a housing for the rotor. The rotor has a shaft which is passed through an opening, which is not sealed, in the housing and magnetic return path yoke. The rotor is composed entirely, or at least on its outside, of a high-temperature superconductor. Magnetic bearings for contactless bearing of the rotor are formed by the superconductor and by annular permanent magnets which are provided at two points. In order to cool the superconductor on the rotor, the entire machine is designed to have a small physical size and is operated completely in a cryogenic bath formed from liquid nitrogen.

Owing to the contactless bearing, the known magnetic bearings always have a continuous bearing gap, and gas and vapor can thus pass through them between the two sides which are connected by the bearing gap. Environmental air and moisture contained in it can thus enter the bearing gap, or can reach the rotor through the bearing gap. This results in the risk of the air humidity freezing on the cold components of the magnetic bearing or else of the rotor, if this is cooled, with such icing resulting in a restriction to operation, or even in damage to the magnetic bearing. Furthermore, the cooling processes with liquid coolant (cryogenic medium), in general liquid nitrogen, which are used exclusively for the superconductors of the described magnetic bearing according to the related art, are generally also subject to sealing problems in the region of the sensitive magnetic bearings, in addition to the problem of any moisture that has entered freezing on the cryogenic medium supply lines that are required, once again increasing the risk of icing or of other malfunctions of the magnetic bearing.

SUMMARY OF THE INVENTION

One aspect of the invention is based on the object of protecting the magnetic bearing or magnetic bearings for bearing of a rotor against such adverse effects on operation or damage.

The device accordingly has a rotor which rotates or can rotate about a rotation axis and at least one magnetic bearing, in which the rotor is borne or can be borne in a contactless manner (or without wear), and which has at least one superconductor (or: a superconducting structure).

The rotor is arranged together with the associated magnetic bearing or bearings in a common gas area (or gas-filled chamber), which is surrounded by a gastight wall. The rotor and magnetic bearings are thus, in other words, located in the same gas atmosphere, which is separated and shielded from the environmental air by the wall through which gas cannot pass. These measures result in the bearing gap of each magnetic bearing being filled with the gas with which the gas area is filled, and being protected by the gas area wall against the ingress of environmental moisture. Furthermore, pressure fluctuations, for example as a result of gas losses, can be tolerated within certain limits, since they affect all the components in the gas area in the same way.

As a further measure, a cooling device having at least one cold head, which is thermally coupled to the superconductor and dissipates heat from the superconductor mainly by thermal conduction as the heat transfer mechanism, is now provided for cooling the superconductor of the magnetic bearing or of each magnetic bearing. The use, as proposed, of a cold head (which in principle is known per se) for indirect cooling of the magnetic bearing is a considerably simpler solution in terms of design and handling than the direct cooling, as provided in the related art, via a liquid cooling medium. A cold head can easily be fitted to the magnetic bearing as a connecting piece for heat transmission. Furthermore, the use of one or more cold heads ensures deliberate cooling of the superconductor in the magnetic bearing and avoids the problems of the emergence (which can never entirely be avoided) of cryogenic liquid and the uncontrolled thermal conditions that result from this, with the risk of icing of the magnetic bearings as a result of freezing of residual moisture in the gas atmosphere or of moisture contained in the evaporated cryogenic medium.

The cooling device for cooling the cold head and hence for indirect cooling of the magnetic bearing or bearings preferably has a cryogenic cooler system which is operated in particular electrically and does not require the handling of cryogenic liquid gases in conjunction with the cold head. Different cold heads may in each case be connected to a dedicated cryogenic coolant, or else in any desired combinations to shared cryogenic coolers. Each cold head is preferably guided from the outside in a direction running essentially at right angles to the rotation axis to the superconducting structure of the magnetic bearing.

The magnetic bearing or bearings of the device generally has or have at least one inner bearing part and at least one outer bearing part, with the outer bearing part surrounding the inner bearing part and with a bearing gap, which runs around the rotation axis, being formed between the two bearing parts, and one of the two bearing parts is connected or can be connected to the rotor, in particular to its rotor shaft.

One of the two bearing parts of the magnetic bearing now preferably has at least one permanent magnet, while the other bearing part has the superconducting structure, which interact electromagnetically (by induction) with the permanent magnet or permanent magnets such that the bearing gap between the inner bearing part and the outer bearing part is formed or maintained. Where there are two or more permanent magnets, these are generally arranged alongside one another, in particular axially one behind the other with respect to the rotation axis and preferably in each case surround the rotation axis in a shape that is closed all round, in particular in the form of a ring, or else alongside one another in an arrangement which surrounds the rotation axis. The permanent magnet or magnets in one advantageous refinement surrounds or surround the rotation axis in a closed (all round) form, preferably in the form of a ring. The ring cross section may in this case in particular be circular, in the form of a disk or rectangular, corresponding to a hollow-cylindrical or toroidal ring shape. The ring longitudinal section at right angles to the rotation axis may thus, in particular, be in the form of a circular ring. Immediately adjacent permanent magnets are preferably magnetized with essentially opposite polarity to one another, at least on average, over domains which may be present.

One advantageous development of the magnetic bearing is characterized in that a flux concentrating element is in each case arranged between at least two of the permanent magnets, and/or a flux concentrating element is in each case arranged on the outside of the outer permanent magnets in the axial direction. Each flux concentrating element is used for conducting the magnetic flux of the permanent magnets and, in general, also for concentrating and amplifying it in the bearing gap and, for this purpose, is at least partially composed of a magnetically permeable material, in particular of a ferromagnetic material, for example iron (Fe).

The superconducting structure preferably surrounds the rotating axis in a closed form, in particular in the form of a ring, and/or essentially has a cylindrical shape, at least on the side facing the bearing gap. Furthermore, it is advantageous for the superconducting structure to be arranged on the side of the bearing part facing the bearing gap, in order to achieve good coupling efficiency.

In general, at least one cold head is in each case provided for each magnetic bearing, for cooling the superconducting structures and, expediently, the permanent magnets as well, in order to achieve a highercoercivity field strength.

The bearing gap of at least one of the contactless magnetic bearings is now preferably connected to the gas area and allows gas to be exchanged. In consequence, the bearing gap is located in the same gas atmosphere as that found in the gas area.

In general, the wall of the gas area is in a fixed position with respect to the rotor, that is to say its position relative to the rotation axis of the rotor remains unchanged during rotation of the rotor.

The rotor is preferably borne in the magnetic bearing via a rotor shaft which is connected or can be connected to the rotor. The rotor shaft is preferably passed to the outside through an opening, which is sealed by a rotation seal, in the wall of the gas area.

In one particularly advantageous embodiment of the device, the rotor is borne in at least two magnetic bearings, preferably via in each case one rotor shaft, which magnetic bearings are arranged on axially opposite sides of the rotor with respect to the rotation axis. The rotor is thus held in bearings on both sides and thus in a particularly robust manner.

One advantageous development of the rotor is characterized by at least one winding (coil) which generally runs around the rotation axis and is preferably formed by a superconductor.

Any low-temperature superconductors or high-temperature superconductors may be used as superconductors for the magnetic bearings and/or for the winding on the rotor. The superconductor may be a traditional low-temperature superconductor with a critical temperature up to 35 K, for example a metallic alloy such as a niobium tin alloy, or preferably a high-temperature superconductor with a critical temperature above 35 K, preferably above 77 K (i.e. the boiling point of nitrogen), preferably a metal-oxide or ceramic high-temperature superconductor such as bismuth strontium calcium copper oxide, yttrium barium copper oxide or a compound of mercury or thallium. The higher the critical temperature of the superconductor, the less energy is required for cooling.

Since high-temperature superconductors are, in particular, self-supporting only to a restricted extent, one advantageous development allows the superconducting structure of the magnetic bearing or the superconducting winding of the rotor to be arranged on or in a support or winding support. In order to cool the superconductor, the support or winding support preferably has a high thermal conductivity, for example being formed from metal.

In one particularly advantageous embodiment, the winding support of the rotor has a cavity (internal area) which extends axially with respect to the rotation axis. The winding can now advantageously be cooled in a space-saving manner via this cavity, in that a heat transmission unit in the cavity or on the cavity is thermally coupled to the winding support, preferably via a contact gas in the cavity.

The heat transmission unit is now preferably thermally coupled or can be thermally coupled to a cooling device for the rotor. This cooling device may be designed in a manner known per se, for example according to the initially cited U.S. Pat. No. 5,482,919 A, whose entire disclosure content is also included in the present application. The cooling device and/or heat transmission unit for the rotor may also operate with a liquid coolant such as liquid helium or liquid nitrogen, or else may have a cryogenic cooler system with at least one cold head, in the same way as the cooling system for the magnetic bearing.

According to one particular embodiment, the heat transmission unit has a preferably cylindrical heat transmission body which projects into the cavity in the winding support and between which and the winding support an intermediate gap is formed, which runs around the rotation axis and is filled with a contact gas. The heat transmission from the or cooling of the winding now takes place essentially by thermal conduction through the solid body and via the contact gas.

However, alternatively or additionally, cyclic vaporization and condensation of a heat transport gas, with appropriately chosen vaporization enthalpy, can also be used as the heat transport mechanism. The heat transmission unit may then, in particular, comprise a heat pipe.

In an embodiment which makes use of both the thermal transport mechanisms of thermal conduction and vaporization, the cavity in the winding support is at least partially filled with the heat transport gas, so that the heat transport gas is also used as the thermally conductive contact gas.

The cavity in the winding support and the intermediate gap between the heat transport body and the winding support can also be connected to the gas area in a manner which allows gas to be exchanged. This then results in a standard gas atmosphere inside and outside the rotor, and there is no longer any need to take any special measures in order to seal these gas areas.

The contactless arrangement of the heat transmission unit in the winding support is particularly advantageous when the two components are intended to be mechanically decoupled from one another, that is to say the heat transmission unit is intended to be fixed during rotation of the rotor. Such a fixed configuration of the heat transmission unit, which does not rotate with the rotor, and possibly of the connected cold head is expedient since there is no need to seal any rotating parts of the cooling system with respect to one another.

In one special physical development, at least one rotor shaft, which is borne in the associated magnetic bearing, is in the form of a hollow shaft. The hollow shaft can now at least partially accommodate the heat transmission unit and/or a connection between the gas area and an internal area of the rotor, in particular the cavity in the winding support In order to protect the winding, it is preferably arranged in an internal area of a container in the rotor, which is preferably evacuated and is sealed from the rest of the gas area and from the cavity in the winding support.

The gas area of the device, in which the rotor and the magnetic bearing are arranged, is generally filled with a gas or a gas mixture which is used for thermal conduction for cooling of those components which need to be cooled and for this purpose makes contact with them and is therefore also referred to as the contact gas. This gas generally remains in the gas area throughout the operating life of the device. The contact gas is therefore in one advantageous embodiment an inert gas or a mixture of inert gases, with helium or neon being preferable, although nitrogen can be used for correspondingly high operating temperatures. Furthermore, in principle, hydrogen or oxygen are also suitable, although their handling is somewhat more problematic.

The gas with which the gas area is filled preferably contains virtually no water, or contains less than a critical amount of water, so that it is impossible for water to freeze on cold parts in the gas area. For this purpose, the gas is prepared with an appropriate purity, and/or is dried.

The gas pressure of the gas in the gas area in one advantageous embodiment is preferably at least as high as, and preferably higher than, the gas pressure in the outer area surrounding the wall of the gas area, in general atmospheric pressure. Even in the event of sealing problems or leakages in the area of the gas area wall, this reliably prevents the ingress of moist air and the possibility of ice being formed in consequence in the cold area.

The device is preferably used for electrical machines such as motors and generators.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
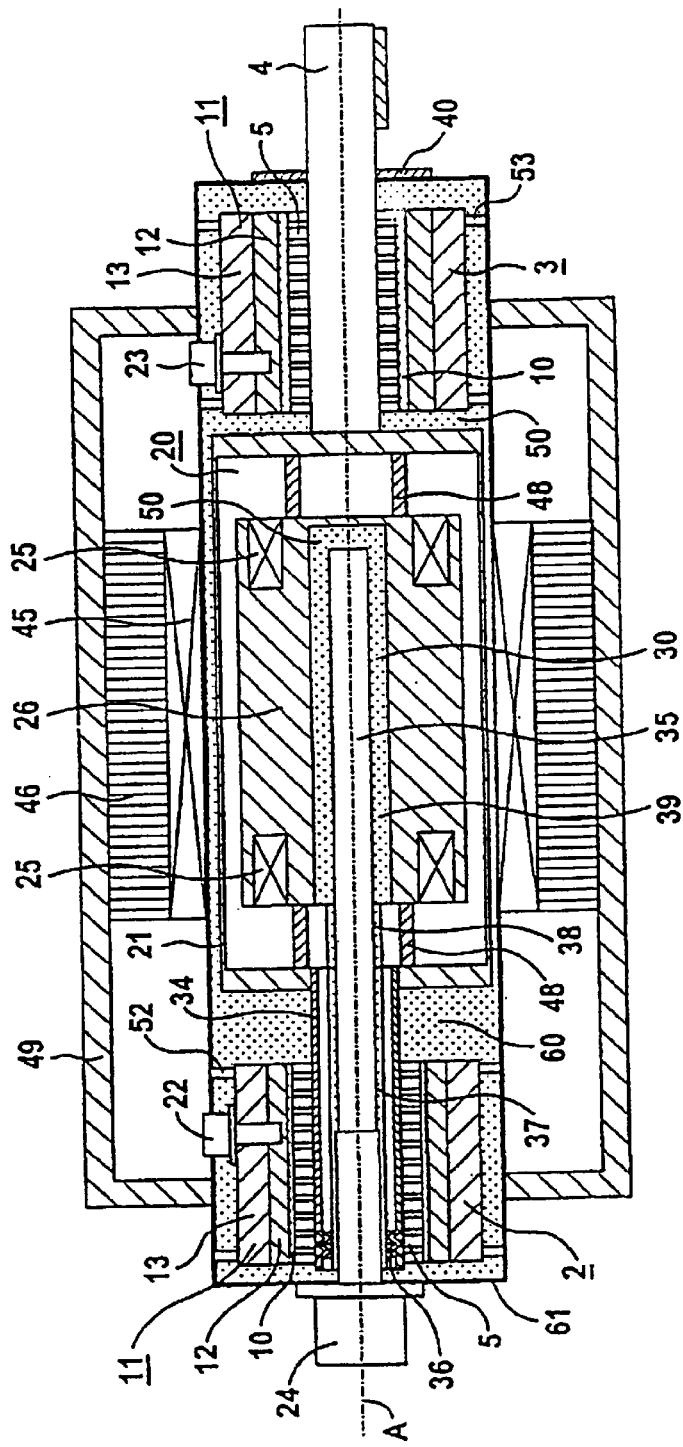
FIG. 1 shows a device having a rotor, which is borne in two magnetic bearings, in a longitudinal section on a plane containing the rotation axis of the rotor.

Reference will now be made in detail to the preferred embodiments of the present invention, examples of which are illustrated in the accompanying drawings, wherein like reference numerals refer to like elements throughout.

FIG. 1 shows a device having a rotor 20 which is borne such that it can rotate in magnetic bearings 2 and 3 positioned respectively on both sides (end faces) axially with respect to its rotation axis A. For this purpose, a first rotor shaft, which is in the form of a hollow shaft (neck tube) 34, is formed or mounted on the rotor 20 on the left-hand side in FIG. 1, and is borne in a contactless manner in the magnetic bearing 2. In the illustrated embodiment, the hollow shaft 34 also has a length compensator 36, in particular an expanding bellows, for length compensation. A second rotor shaft 4 (which is, for example, solid), is formed or mounted on the rotor 20 on the opposite side, on the right in FIG. 1, and is borne in a contactless manner in the magnetic bearing 3. Both shafts, the hollow shaft 34 and the rotor shaft 4, are preferably rotationally symmetrical with respect to the rotation axis A, in particular being hollow-cylindrical or cylindrical, or else at least slightly conical.

Each of the magnetic bearings 2 and 3, which are preferably essentially the same, has a bearing inner part 5, which is connected to the associated hollow shaft 34 or rotor shaft 4, and a bearing outer part 11, which surrounds the bearing inner part 5 forming a bearing gap 10. The bearing inner part 5 has two or more permanent magnets, which are not annotated in any more detail in FIG. 1, on its outside facing the bearing gap 10. Opposite the permanent magnets, the bearing outer part 11 has a superconducting structure 12 on its inside facing the bearing gap 10, and this is supported on the outside on a supporting body 13. The superconducting structure 12 makes contact with a respective cold head 22 or 23, which projects through the supporting body 13 from the outside, for cooling. The design of the magnetic bearings 2 and 3 will be described with reference to the detailed FIGS. 2 to 4. First of all, the further parts of the device shown in FIG. 1 will now be described in more detail.

The rotor 20 has at least one winding (coil) 25, which is composed of a superconducting material and has one or more turns which run around the rotation axis A, preferably with essentially the same radius. The winding 25 is supported on or in a winding support 26, which surrounds the rotation axis A in the form of a hollow body, preferably with a hollow-cylindrical shape. The winding support 26 is composed of a thermally highly conductive material such as a metal.

A central cavity 30, through which the rotation axis A runs, is formed in the interior of the winding support 26. On the side pointing toward the rotor shaft 4, the cavity 30 is closed by the winding support 26, while it is open on the side pointing toward the hollow shaft 34. On this side, a cylindrical heat transmission body 35 projects through the opening in the winding support 26 into the cavity 30, and extends to a point shortly before its end on the opposite side. The heat transmission body 35 is composed of a thermally highly conductive material, for example of a metal such as aluminum or copper, or, in order to avoid Eddy currents, alternatively of a dielectric, thermally conductive material such as a ceramic, for example aluminum oxide ($Al_2O_3$) or aluminum nitride (AlN), or of monocrystalline sapphire.

An intermediate space 39 is formed all round between the heat transmission body 35 and the inner surface of the winding support 26. Adjacent to the winding support 26, the heat transmission body 35 is passed outward through a central cavity in the suspension element 48 located on this side, into the cavity of the hollow shaft 34, in each case forming an intermediate space 38 or 37. The intermediate spaces (gaps) 37 to the hollow shaft 34, 38 to the suspension element 48 and 39 to the winding support 26 mean that the heat transmission body 35 can be arranged in a fixed position overall with respect to these rotating parts and the respective rotor 20, that is to say not rotating with them.

A contact gas is introduced at least into the intermediate space 39 between the heat transmission body 35 and the winding support 26, and provides thermal coupling between the winding support 26 and the heat transmission body 35. The intermediate spaces 39, 38 and 37 are preferably connected to one another, as shown, so that the contact gas is located in all the intermediate spaces 37 to 39. Helium or neon is preferably provided as the contact gas.

At its end facing away from the end that is located in the cavity 30 in the winding support 26, the heat transmission body 35 is thermally coupled to one end of a cold head 24, which extends into the hollow shaft 34 from the opposite side, axially with respect to the rotation axis A. The heat transmission body 35 is cooled via the cold head 24, which is connected to a cooling device which is not illustrated in any further detail, in particular to a cryogenic cooler that is known per se. In consequence, the winding support 26 is also cooled indirectly by thermal conduction via the contact gas and, finally, the superconducting winding 25, which actually needs to be cooled, is cooled by the good thermal conduction capability of the winding support 26. This therefore provides cooling for a rotating part, the winding 25, via a stationary part, the heat transmission body 35.

The winding support 26 together with the winding 25 is arranged in the internal area of a container 21 and is suspended on both end faces on the wall of the container 21, via in each case one suspension element 48 with a metal sleeve and a hollow core composed of thermally insulating material. On the outside (outer surface), the winding support 26 is at a distance from the wall of the container 21. The intermediate space which is formed in the internal area of the container 21 between the winding support 26 and the container wall is preferably evacuated to a desired residual pressure, in order to ensure that the winding support 26 is thermally insulated as well as possible from the outside. This evacuated area in the container 21 is separated in a gastight manner by the winding support 26 itself and by the two suspension elements 48 from the Intermediate spaces 39 and 38 around the heat transmission body 35.

The rotor 20 together with the two rotor shafts 34 and 4 and the two magnetic bearings 2 and 3 are now jointly arranged in a gas area 60, which is surrounded in a gastight manner by a wall 61 through which gas cannot pass. This gas area 60 is filled with a gas 50 with a predetermined composition, in particular a chemically resistant (inert) gas such as neon or helium, or a mixture of them.

The hollow shaft 34 on the rotor 20 now preferably opens, as illustrated, at the end facing the rotor 20 into the gas area 60, so that a gas connection is formed between the external region of the gas area 60 and the intermediate spaces 37, 38 and 39. Furthermore, the bearing gaps 10 of the magnetic bearings 2 and 3 are also each open on both sides to the gas area 60. The intermediate spaces 37, 38 and 39, the bearing gaps 10 and the other gas area 60 are thus filled with the same gas 50. The gas 50 thus at the same time forms the contact gas for cooling the winding 25 and acts as a protective gas for the magnetic bearings 2 and 3, thus carrying out a plurality of functions.

The cold head 24 for the winding 2 and the cold heads 22 and 23 for the magnetic bearings 2 and 3 are passed through the wall 61 of the gas area 60, and are expediently also held or secured on the wall 61 of the gas area 60. The bearing outer parts 11 of the magnetic bearings 2 and 3 are also mounted on the wall 61, via holding elements 52 and 53, respectively. The wall 61 and the components which are mounted on it are preferably fixed in position and do not rotate with the rotor 20.

The rotor shaft 4, which is mounted in the magnetic bearing 3, passes through an opening in that end face of the wall 61 of the gas area 60 which is opposite the cold head 24. This passage for the rotor shaft 4 through the wall 61 of the gas area 60 is sealed from the inside by an externally located rotating seal 40, in particular a sliding ring or retaining ring seal, a radial shaft seal, a gland seal or a ferro-fluid seal against the ingress of air from the outside or against the contact gas 50 escaping.

The pressure of the gas 50 in the gas area 60 is generally set to at least atmospheric pressure (approximately 1 bar) and preferably to a pressure which is greater than atmospheric pressure. This results in a device which is insensitive to pressure fluctuations and is particularly well protected against air moisture entering from the outside, and against leakage.

The gas 50 is generally at least approximately at the ambient temperature in the region of the gas area 60 (outer area) that is located outside the rotor 20 and outside the magnetic bearings 2 and 3. The temperature gradient between the cryogenic temperatures inside the rotor 20 and inside the magnetic bearings 2 and 3, on the one hand, and the considerably higher temperature in the external area of the gas area 60 on the other hand is maintained in relatively narrow gaps, which are filled with the gas 50 and are formed by the intermediate spaces 37 to 39 and the bearing gaps 10. In order to produce the temperature gradient in the gas gap which is formed from the intermediate space 37 between the hollow shaft 34 and the cold head 24, annular brushes, which are not shown, for example three to five brushes, can also be arranged staggered in the axial direction in the gas gap, in order to avoid or to reduce the introduction of heat by convection.

Outside the container 21, the winding 26 surrounds a stator winding 45 on a stator support 46. The stator winding 45 and stator support 46 together with an external housing which encloses them both form the stator of an electric motor, in particular of a synchronous motor, or generator. These are the preferred applications, but not the only applications, of the device according to the invention.

Figure 2:
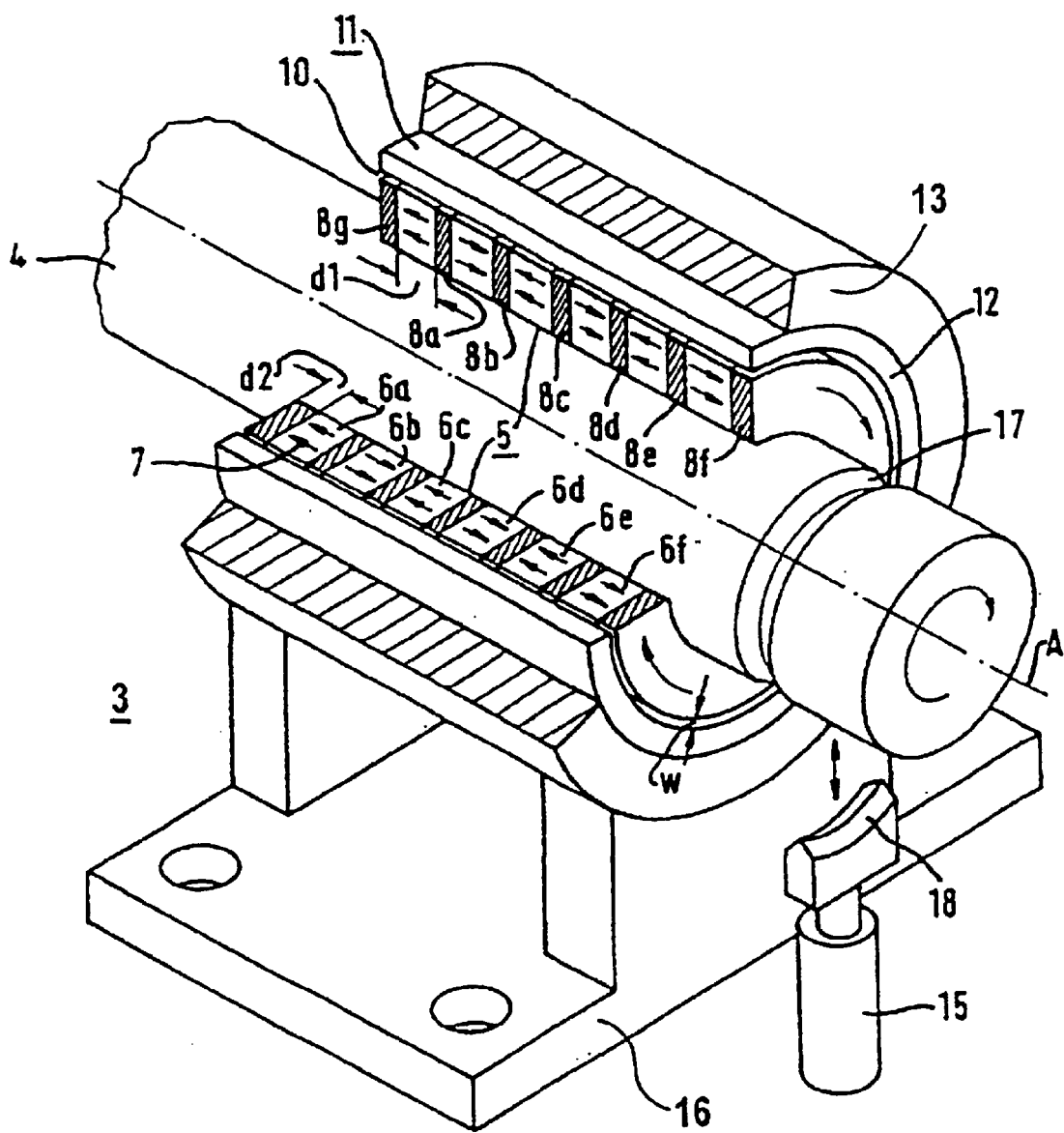
FIG. 2 shows an embodiment of a magnetic bearing of the device, in a perspective and partially sectioned view.

FIG. 2 shows a magnetic bearing which may be used in particular as the magnetic bearing 3 shown in FIG. 1, illustrated in an enlarged, perspective form. The bearing inner part 5 is provided with two or more, for example six, permanent-magnet elements (permanent magnets) 6a to 6f in the form of annular disks. These permanent-magnet elements 6a to 6f are in each case polarized such that, seen axially, that is to say in the direction of the rotation axis A, the polarization alternates from one element to the next. The individual polarization directions are indicated by lines 7 with arrows on them in the figure. Elements (intermediate elements) 8a to 8e composed of a ferromagnetic material, for example iron, and in the form of annular disks are arranged between the permanent-magnet elements 6a to 6f. Furthermore, ferromagnetic elements 8f and 8g, which correspond to the elements 8a to 8e, are provided on the end-face outer surfaces of the outer permanent-magnet elements 6a to 6f. The ferromagnetic material of these ferromagnetic elements 8a to 8g is used to concentrate and homogenize the magnetic flux on the cylindrical outer surface of the bearing inner part 5, and thus increases the supporting force of the bearing 2. At the same time, the ferromagnetic elements 8a to 8g also mechanically reinforce the bearing inner part 5 with the permanent-magnet elements 6a to 6f, which are generally composed of a brittle material. All the elements 6a to 6f and 8a to 8g are mounted in the form of a stack, axially one behind the other, on the rotor shaft 4. The rotor shaft 4 is advantageously composed of a nonmagnetic material, or material which cannot be magnetized, for example of a special steel.

The bearing inner part 5 is surrounded by a hollow-cylindrical, fixed-position bearing outer part 11, separated by a bearing gap 10. The gap width (radial size) w of the bearing gap 10 between the bearing inner part 5 and the bearing outer part 11 is preferably in the same order of magnitude as the axial thickness d2 of the ferromagnetic intermediate elements 8a to 8g, and is typically between 0.1 mm and 5 mm, and preferably between 0.3 mm and 1.5 mm.

The bearing outer part 11, which forms a stator, has a superconducting structure 12 on its inner face, facing the bearing inner part 5, which superconducting structure 12 is supported externally on a supporting body 13 which is composed, for example, of metal, in particular copper (Cu). Any known superconductor material, in particular textured $YBa_2Cu_3O_{7-x}$, may be used as the superconducting material for the superconducting structure 12. The crystalline a–b planes of at least a large proportion of the superconductor material are in this case advantageously aligned essentially parallel to the outer surface of the bearing inner part 5. The mean grain size (grain diameter) of the crystallites (grains) of the superconductor should in this case be larger than the axial thickness d1 of the permanent-magnet elements 6a to 6f, with the grain size being considered in the crystalline a–b planes.

The magnetic flux which is caused by adjacent permanent-magnet elements (for example 6d, 6e) on the bearing inner part 5 is largely concentrated in the shared ferromagnetic intermediate element (8d) and thus emerges with a high flux density via this intermediate element into the bearing gap 10. In the bearing gap 10, the flux path is closed to the respectively adjacent intermediate elements (8c and 8e, respectively). The magnetic flux which is produced by the individual magnetic poles induces corresponding currents, which in turn result in magnetic coupling or negative feedback, in the fixed-position superconducting structure 12 which surrounds the bearing inner part 5 and bounds the bearing gap 10. The magnetic flux path in the area of the nonmagnetic material of the rotor shaft 4 is closed on the side of the rotor shaft 4. This advantageously avoids any magnetic short-circuit there, which would lead to a reduction in the magnetic flux emerging into the bearing gap 10.

The permanently magnetic material of the elements 6a to 6f should have a maximum energy product $(B*H)_{max}$ of at least 20 MGOe, in order to apply the necessary bearing forces and provide the necessary bearing robustness. Suitable materials with such a high energy product are in particular a neodymium (Nd) iron (Fe) boron (B) alloy, or a samarium (Sm) cobalt (Co) alloy. The permanently magnetic material may also, if required, be cooled in order to increase its coercivity field strength.

Outside the region of the bearing inner part 5, the magnetic bearing 3 has a holding and centering apparatus 15 which can be lowered and absorbs the bearing force when at rest, when the superconducting material is above its operating temperature.

At the same time, the bearing position is centered axially and laterally by a groove 17 in the rotor shaft 4 and by a rest 18, in the form of a blade, on the device 15. Electromagnetic induction results in electromagnetic forces between the bearing inner part 5 and the bearing outer part 11 (stator) which surrounds it, and these electromagnetic forces act counter to the direction of movement and lead to the bearing inner part 5 and the rotor shaft 4 floating freely approximately in the center of the bearing gap 10. This type of bearing makes it possible to achieve bearing pressures of up to 10 bar and considerable bearing stiffness against movements of the rotor shaft 4 and of the rotor 20 in the radial and axial directions.

Figure 3:
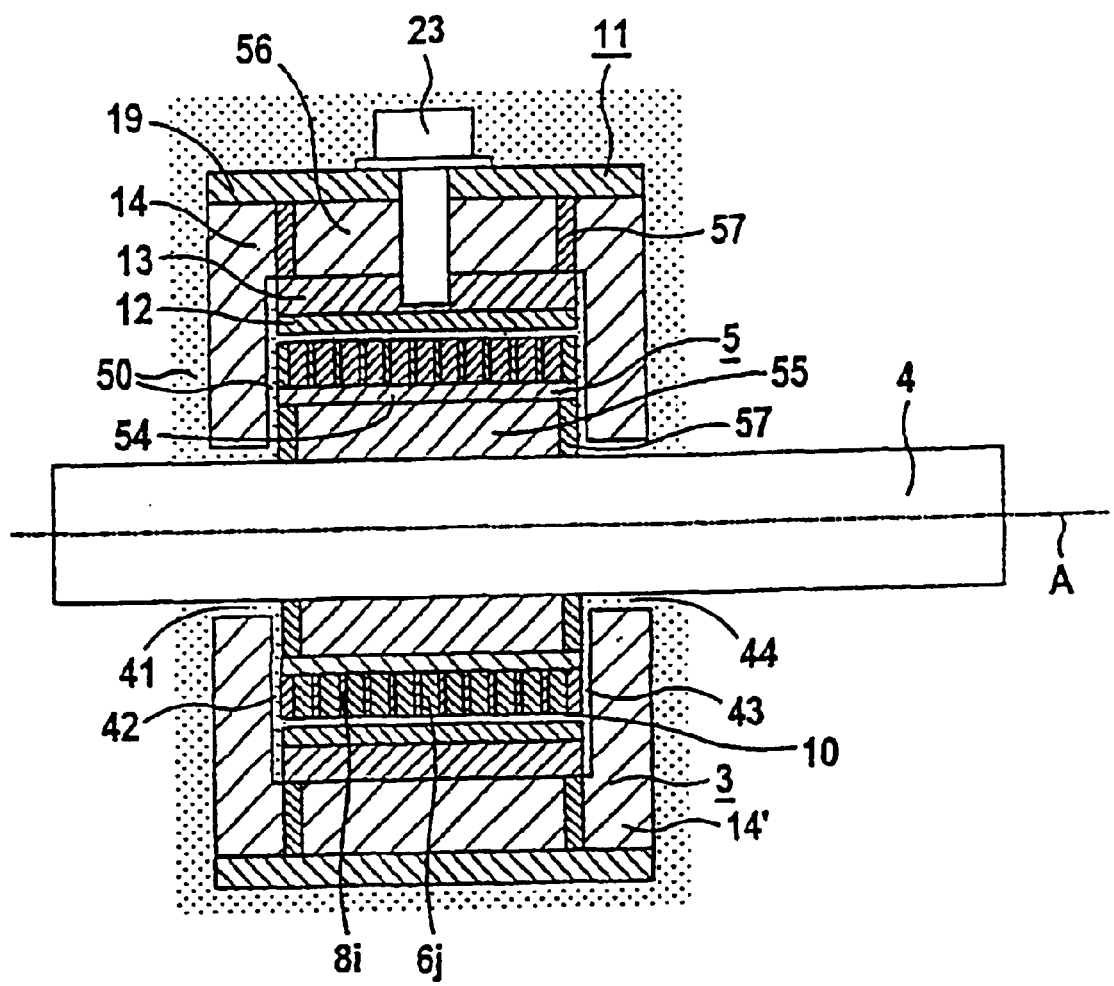
FIG. 3 shows another embodiment of a magnetic bearing of the device, in a longitudinal section.

FIG. 3 shows a further embodiment of a magnetic bearing, which is expediently used as the magnetic bearing 3 (or 2) as shown in FIG. 1. A stack of permanent-magnet elements 6j alternating with ferromagnetic elements 8i is once again provided on the bearing inner part 5. This stack of elements 6j and 8i is mounted, as shown in FIG. 3, on a supporting body 54, which is kept at a distance from the rotor shaft 4 by holding disks 57 which are composed of thermally insulating, mechanically robust material, for example of a fiber-reinforced, in particular glass-fiber-reinforced, plastic, and with a thermal insulation material 55 located in between. The bearing outer part 11 likewise once again has a superconducting structure 12 and a supporting body 13 for the superconducting structure 12.

A cold head 23 is once again connected to the supporting body 13, running vertically from the outside to the inside, and is thus thermally coupled to it, and rests on or is attached to an outer sleeve 19 of the magnetic bearing 3. The supporting body 13 is connected to the outer sleeve 19 via holding disks 57 and thermal insulation material 56 arranged in between.

In the particular refinement shown in FIG. 3, a thermal insulation body 14 or 14', which points inward to the rotor shaft 4 from the outside sleeve 19, is now in each case mounted in front of the end faces of the superconducting structure 12 with the supporting body 13 and the inner bearing part 5 with the magnet stack on both sides, axially with respect to the rotation axis. A first bearing gap element 41, which runs parallel to the rotation axis A, is formed between the thermal insulation body 14 and the rotation shaft 4. A second bearing gap element 42, which runs at right angles to the rotation axis A, is formed between the bearing inner part 5 and a side of the thermal insulation body 14 which faces inward toward the bearing inner part 5. A third bearing gap element 43, which runs at right angles to the rotation axis A, is formed in an analogous manner between the bearing inner part 5 and a side of the further thermal insulation body 14' which faces inward toward the bearing inner part 5, and a further, fourth bearing gap element 44, which runs parallel to the rotation axis A once again, is formed between the rotation shaft 4 and the thermal insulation body 14'. A gas passage through the magnetic bearing 3 for the gas 50 is formed by the first bearing gap element 41, the second bearing gap element, the bearing gap 10, the third bearing gap element 43 and the fourth bearing gap element 44 that are connected in series. The advantage of this specific embodiment of the bearing gaps is that the first bearing gap element 41 and the fourth bearing gap element 44, which are located in the comparatively warm end regions of the magnetic bearing 3, are located closer to the rotation axis A than the bearing gap 10, and the gas 50 in the two bearing gap elements 41 and 44 is subjected to a correspondingly less centrifugal force during rotation of the rotor shaft 4 with the bearing inner part 5. This in turn means that, when the bearing inner part 5 is rotating on the rotor shaft 4, the density of the gas 50 which rotates with it in the bearing gap elements 41 and 44 (as well as 42 and 43) which are closer to the axis is reduced, and that in the bearing gap 10 which is further from the axis is greater. Since, on the other hand, the density of the gas 50 increases again since the temperature decreases sharply toward the bearing gap 10, these two effects that act in opposite senses compensate for one another, to a certain extent. This embodiment of the magnetic bearing 3 thus results in a more homogeneous density distribution and more stable layering of the gas 50 within the magnetic bearing 3.

Figure 4:
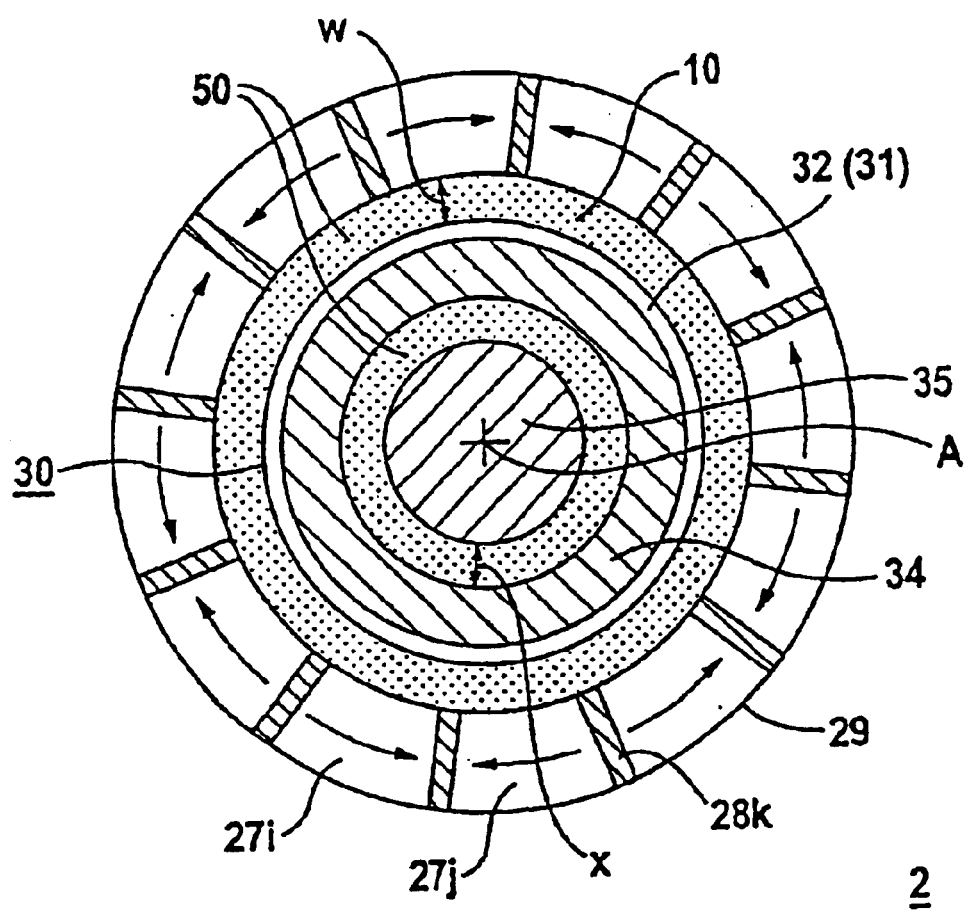
FIG. 4 shows a further embodiment of a magnetic bearing of the device, in a cross section in a plane at right angles to the rotation axis.

FIG. 4 shows a cross section through a modified form of a magnetic bearing 2 for the device as illustrated in FIG. 1.

The permanent-magnet elements on the outer bearing part, which is annotated 29, of the magnetic bearing 2 and a hollow-cylindrical, superconducting structure, which is annotated 32 and is fitted on the outside of the hollow shaft 34, are now provided as the inner part 31. Furthermore, the permanent magnets of the magnetic bearing 2 are not stacked axially, with permanent-magnet elements 27$i$, 27$j$ (where $1 \leq i \leq j$; $1 \leq j \leq n$) which are axially extended and are in the form of segments of hollow cylinders being provided instead. The permanent-magnet elements 27$i$, 27$j$ are each spaced apart from one another via ferromagnetic elements 28$k$(where $1 \leq k \leq 2n$), which are like strips and are likewise in the form of segments of hollow cylinders, and, together with them, form a closed hollow-cylindrical arrangement for the outer bearing part 29. The fixed-position outer bearing part 29 surrounds the inner bearing part 31, which can rotate, at a distance w which is defined by the gap width w of the bearing gap 10. The hollow shaft 34 in turn surrounds the heat transmission body 35, forming the intermediate space 37 with the gap width x. The illustrated cross section clearly shows that both the gaps, which are arranged concentrically with one another, the bearing gap 10 and the intermediate space 37, are each filled with the same gas 50.

Figure 5:
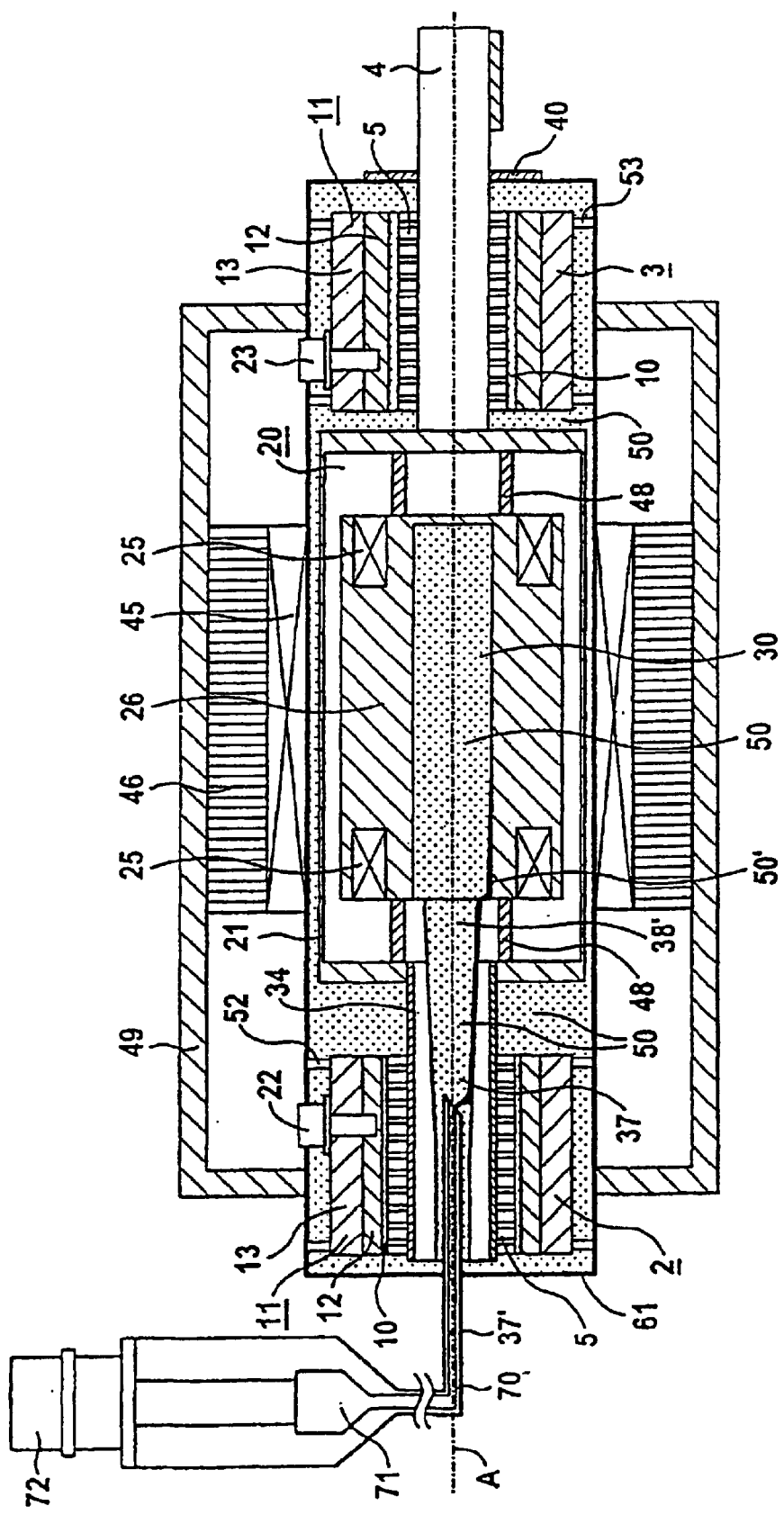
FIG. 5 shows a device having a rotor, which is borne in two magnetic bearings, and having a heat pipe, in a longitudinal section, in each case illustrated schematically. Mutually corresponding parts are provided with the same reference symbols in FIGS. 1 to 5.

FIG. 5 shows an embodiment of a device, modified from that shown in FIG. 1, in which the heat transmission unit as shown in FIG. 1, which is formed from the heat transmission body 35 and the cold head 24, is replaced by a heat transmission unit as shown in FIG. 5, which operates on the heat pipe principle. Working liquid 50', which preferably corresponds to the liquefied contact gas 50, is introduced into the cavity 30 via a preferably vacuum-insulated heat pipe 70 and via an internal area 38' which widens conically from the rear part of the hollow shaft 34 through the suspension element 48 to the cavity 30 in the winding support 26. The heating results in the working liquid being vaporized, and dissipates heat from the winding support 26 in the form of vaporization heat. The vaporized gas 50, which is used as the working gas for the heat pipe 70, is transported on the opposite path through the internal area 38' and through the heat pipe 70 to a condenser 71 which is located outside the gastight wall 61, where it is cooled down via the cold head 72 until it once again liquefies (condenses) to form the working liquid 50'. The circuit (working cycle) in the heat pipe 70 then commences once again. In this embodiment, the gas 50 is used not only as a contact gas but also as a working gas for the cooling process by the heat pipe. A narrow intermediate gap 37' is formed between the heat pipe 70 and the hollow shaft 34, is connected to the rest of the gas area 60, and allows mechanical decoupling between the heat pipe 70 and rotating parts such as the hollow shaft 34.

For further details of the materials, configuration, dimensions and operation of the magnetic bearings, in particular as shown in FIGS. 1 to 5, reference shall be made to DE 44 36 831 C2, whose contents are also included in the disclosure of the present application.

The invention has been described in detail with particular reference to preferred embodiments thereof and examples, but it will be understood that variations and modifications can be effected within the spirit and scope of the invention.

What is claimed is:

1. A device comprising:
    a rotor which is rotatable about a rotation axis, the rotor having at least one superconducting winding, which runs around the rotation axis;
    a magnetic bearing, to support the rotor in a contactless manner, the magnetic bearing having a fixed position superconducting structure;
    a cooling device having a cold head for indirect cooling of the superconducting structure of the magnetic bearing, the superconducting structure being cooled without a liquid cooling medium between the cold head and the superconducting structure; and
    a gastight wall defining a common gas area, which at least partially encloses the rotor and the magnetic bearing.

2. The device as claimed in claim 1, wherein the rotor has at least two magnetic bearings, which are arranged on axially opposite sides of the rotor with respect to the rotation axis.

3. The device as claimed in claim 1, wherein the rotor is supported by the magnetic bearing via a rotor shaft connected to the rotor.

4. The device as claimed in claim 3, wherein
    the rotor shaft passes through an opening in the gastight wall, and
    the opening in the gastight wall is sealed by a rotation seal.

5. The device as claimed in claim 1, wherein the winding is arranged in a thermally conductive winding support, which has a cavity extending axially with respect to the rotation axis.

6. The device as claimed in claim 5, wherein the cavity in the winding support is connected to the common gas area in a manner which allows gas to be exchanged between the cavity and the common gas area.

7. The device as claimed in claim 5 further comprising a heat transmission unit thermally coupled to the winding support, via a contact gas, the heat transmission unit being thermally coupled to the cooling device.

8. The device as claimed in claim 7, wherein the heat transmission unit is mechanically decoupled from the rotor.

9. The device as claimed in claim 8, wherein the rotor rotates with respect to the heat transmission unit.

10. The device as claimed in claim 7, wherein
    the heat transmission unit has a heat transmission body which projects into the cavity in the winding support, and
    an intermediate space between the heat transmission unit and the winding support, is filled with a contact gas and is in fluid communication with the common gas area.

11. The device as claimed in claim 7, wherein the heat transmission unit dissipates heat from the winding support by cyclic vaporization and condensation of a heat transport gas.

12. The device as claimed in claim 5 wherein
    the cavity in the winding support is at least partially filled with the heat transport gas,
    the heat transmission unit dissipates heat from the winding support by cyclic vaporization and condensation of a heat transport gas.

13. The device as claimed in claim 1, wherein
    the rotor is supported by the magnetic bearing via a rotor shaft connected to the rotor,
    the winding is arranged in a thermally conductive winding support, which has a cavity extending axially with respect to the rotation axis,
    the device further comprise a heat transmission unit thermally coupled to the winding support, via a contact gas, the heat transmission unit being thermally coupled to the cooling device,
    the rotor shaft is in the form of a hollow shaft, and
    the contact gas runs through the hollow shaft to thermally couple the heat transmission unit to the cooling device.

14. The device as claimed in claim 1, wherein the rotor has a gastight container which is evacuated, and the winding is arranged within the gastight container.

15. The device as claimed in claim 1, wherein the magnetic bearing comprises:

at least one inner bearing part;

at least one outer bearing part; and at least one permanent magnet positioned on one of the two bearing parts such that the superconducting structure is positioned on the other of the two bearing parts, the permanent magnet and the superconducting structure interacting with one another electromagnetically such that a bearing gap, which runs around the rotation axis, is maintained between the inner bearing part and the outer bearing part.

16. The device as claimed in claim 15, wherein the rotor is supported on a rotor shaft, the inner bearing part is connected to the rotor shaft, and the outer bearing part has the superconducting structure and is connected to the cold head.

17. The device as claimed in claim 15, wherein there are at least two magnetic bearings, the bearing gap of each magnetic bearing is connected to the common gas area at an axial end of the common gas area with respect to the rotation axis.

18. The device as claimed in claim 17, wherein the bearing gap is connected to the common gas area via connecting channels which are located closer to the rotation axis than the bearing gap.

19. The device as claimed in claim 15, wherein the magnetic bearing has two or more permanent magnets, which are arranged axially with respect to the rotation axis.

20. The device as claimed in claim 19, wherein a flux concentrating element, which is at least partially formed of a magnetically permeable material, is arranged between each of the two or more permanent magnets to guide the magnetic flux of the permanent magnets.

21. The device as claim 15, wherein the magnetic bearing has two or more permanent magnets, which are arranged alongside one another in an arrangement which surrounds the rotation axis.

22. The device as claimed in claim 1, wherein the superconductor structure has a superconductor having a critical temperature above 35 K.

23. The device as claimed in claim 1, wherein the cooling device has a cryogenic cooler system, which is thermally coupled to the cold head, to cool the superconducting structure of the magnetic bearing.

24. The device as claimed in claim 1, wherein the cold head extends from the superconducting structure to outside of the gastight wall, in a direction running essentially at a right angle to the rotation axis.

25. The device as claimed in claim 1, wherein the common gas area is filled with an inert gas.

26. The device as claimed in claim 25, wherein the common gas area contains substantially no water.

27. The device as claimed in claim 25, wherein the common gas area contains less than an amount of water sufficient to cause freezing.

28. The device as claimed in claim 1, wherein the common gas area is at a pressure which is at least as high as a gas pressure outside of the gastight wall.

29. The device as claimed in claim 1, wherein the superconductor structure has a superconductor having a critical temperature above 77 K.

30. The device as claimed in claim 1, wherein the common gas area is filled with at least one of helium, neon or nitrogen.

31. The device as claimed in claim 1, wherein the common gas area is at atmosphere pressure or a higher pressure.

32. A device comprising:

a rotor which is rotatable about a rotation axis;

a magnetic bearing, to support the rotor in a contactless manner, the magnetic bearing having a superconducting structure;

a cooling device having a cold head for cooling the superconducting structure of the magnetic bearing, the superconducting structure being cooled without a liquid cooling medium between the cold head and the superconducting structure; and a gastight wall defining a common gas area, which at least partially encloses the rotor and the magnetic bearing.

* * * * *